(12) United States Patent
Owen (10) Patent No.: US 7,430,622 B1
(45) Date of Patent: Sep. 30, 2008

(54) EXTENDED FAIRNESS ARBITRATION FOR CHAINS OF POINT-TO-POINT DEVICES HAVING MULTIPLE VIRTUAL CHANNELS

(75) Inventor: Jonathan Mercer Owen, Northboro, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 508 days.

(21) Appl. No.: 11/036,361

(22) Filed: Jan. 18, 2005

(51) Int. Cl.
*G06F 13/14* (2006.01)
(52) U.S. Cl. .......................................... 710/29; 710/36
(58) Field of Classification Search ........................ None
See application file for complete search history.

(56) References Cited

U.S. PATENT DOCUMENTS

| 2002/0083233 | A1 | 6/2002 | Owen et al. | |
| 2003/0097514 | A1* | 5/2003 | Ennis et al. | 710/306 |
| 2004/0030799 | A1* | 2/2004 | Gulati | 709/233 |

OTHER PUBLICATIONS

"AMD-3181™ HyperTransport™ PCI-X® Tunnel Data Sheet", 24637 Rev. 3.02, Aug. 10, 2004, pp. 1-87.

* cited by examiner

*Primary Examiner*—Ilwoo Park
(74) *Attorney, Agent, or Firm*—Manelli Denison & Selter PLLC; Leon R. Turkevich (57) ABSTRACT

Buffer-level arbitration is used to allocate released buffers, based on received flow control credits, between local packets and received packets on respective virtual channels in accordance with a determined insertion rate relative to a second number of received packets to be forwarded. Virtual channel arbitration also is performed to identify, from among the multiple virtual channels, the packets that should be sent next along the local and forwarded paths. Device arbitration is then performed to identify, from the insertion and forwarding paths, the packets that should be output onto an output transmission link, based on the determined insertion rate. Performing the arbitration at each step in accordance with the insertion rate maximizes packet bandwidth fairness among the multiple devices supplying packets across multiple virtual channels.

10 Claims, 4 Drawing Sheets

EXTENDED FAIRNESS ARBITRATION FOR CHAINS OF POINT-TO-POINT DEVICES HAVING MULTIPLE VIRTUAL CHANNELS

BACKGROUND OF THE INVENTION

1. Field of the Invention

The present invention relates to allocation of bandwidth within in a chain of devices interconnected via a plurality of point-to-point communication links.

2. Background Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Many computer systems generally have been designed around a shared bus architecture, in which one or more host processors and a host memory are coupled to a shared host bus. Transactions between processors and accesses to memory all occur on the shared bus. Such computer systems typically include an input/output (I/O) subsystem which is coupled to the shared host bus via an I/O bridge which manages information transfer between the I/O subsystem and the devices coupled to the shared host bus. Many I/O subsystems also generally follow a shared bus architecture, in which a plurality of I/O or peripheral devices are coupled to a shared I/O bus. The I/O subsystem may include several branches of shared I/O buses interconnected via additional I/O bridges. These shared I/O busses typically use a central arbiter to grant use of the bus to the devices connected to it. Fair allocation of the available bandwidth on the bus may be guaranteed by implementing a fair arbitration algorithm in the central arbiter.

Figure 1:
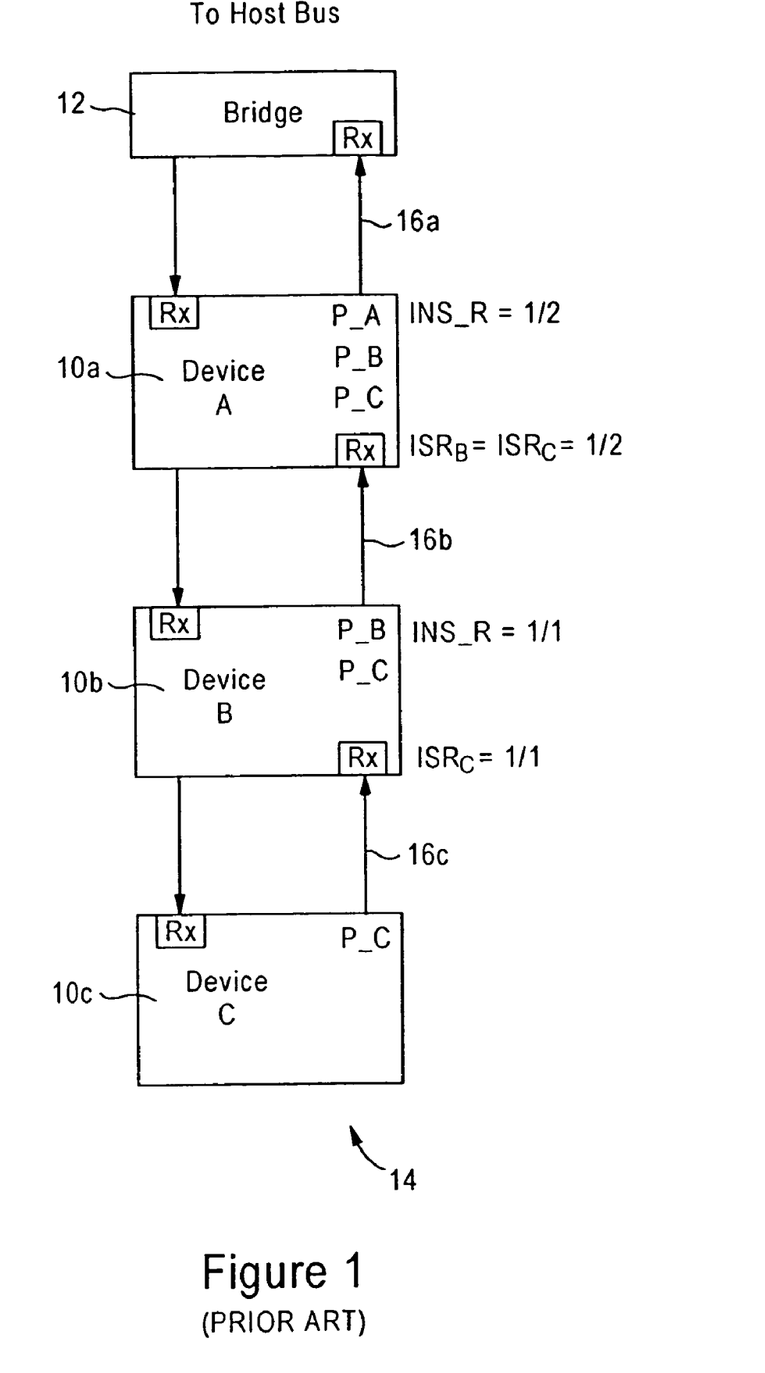
FIG. 1 is a block diagram of a prior implementation (PRIOR ART) of a fairness algorithm in a chain of I/O devices.

U.S. Patent Publication No. US 2002/0083233 to Owen et al., the disclosure of which is incorporated in its entirety herein by reference, discloses a method for fairly allocating bandwidth to devices connected by a plurality of point-to-point links, in which arbitration is distributed among the devices rather than performed by a central arbiter. As illustrated in FIG. 1, which summarizes FIG. 2 of Owen et al., each device 10a, 10b, and 10c is configured for selecting between transmitting its own packet (i.e., a local packet), and a received packet from a supplying device, according to a corresponding determined insertion rate. The I/O devices (10) and bridge (12) each contain buffers (Rx) associated with each incoming link, into which packets are placed as they are received. As packets are removed from the buffers (due to being consumed internally or forwarded to the next device in the chain), buffer release messages are sent back to the transmitter at the other end of the link, indicating that buffers have been freed. A transmitter may only send packets when the corresponding receiver has indicated that it has space to receive them. No packets are dropped. Therefore, the limiting factor that determines the maximum rate at which packets may be transmitted along a link may be either the raw bandwidth of the link, or the rate at which buffer releases are received, whichever is lower.

In the case where all 3 links (16a, 16b, 16c) have the same available bandwidth, and all 3 I/O devices (10a, 10b, 10c) are attempting to send streams of packets to the bridge at a total rate exceeding the available bandwidth of link 16a, links 16b and 16c may back up. Device 10a's receive buffers may be filling with packets originating from device 10b and device 10c at up to the full link bandwidth of link 16b, but the buffers will be draining at a lower rate, since insertion of a packet originating at device 10a does not drain a receive buffer. Since the buffers are filling faster than they are draining, they will eventually fill to capacity, causing device 10b to stop sending packets across link 16b. At that point, device 10b will only be able to send a packet when it receives a buffer release from 10a, which will only happen when device 10a frees a buffer by forwarding a packet. Thus, the maximum usable bandwidth on link 16b has been reduced to the amount of bandwidth actually used on link 16a by packets forwarded from 16b. This pattern repeats with each succeeding link.

Owen et al. describes that each I/O device 10a, 10b, and 10c is configured for determining an insertion rate (INS_R) for transmitting a corresponding local packet relative to transmission of received packets from the corresponding connected supplying device. As described below, each I/O device that receives packets from a supplying devices determines an "issue rate" (ISR) for each supplying device (defined as the number of packets received from a corresponding supplying device relative to the total number of received packets), and sets its insertion rate (INS_R) to equal the highest determined issue rate.

Referring to traffic from the I/O device 10c destined to the bridge 12 via the I/O device 10b, the I/O device 10a, and the bridge 12, the I/O device 10c is deemed the supplying device relative to the I/O device 10b, and the I/O device 10b is deemed the supplying device relative to the I/O device 10a.

According to Owen et al., each device independently makes the decision when to forward a packet from its receive buffers or insert a locally generated packet. In the case where there are only packets to be forwarded or packets to be inserted, but not both, and a buffer is available to receive a packet, the next packet of the appropriate type can go; when there is no contention for the output link, either type of traffic is allowed to use all the available bandwidth that it can. In the case of bandwidth contention, where packets from both sources are available to be sent, bandwidth is allocated based on each device matching its insertion rate (INS_R) to the highest issue rate (ISR) detected from among the supplying devices. For example, the I/O device 10b determines that the I/O device 10c has a 100% issue rate ($ISR_C=1$), where all packets received by device 10b are from device 10c due to the I/O device 10c being at the end of the chain 14; hence the I/O device 10b is configured for selecting a 100% insertion rate (INS_R=1), namely inserting for transmission one of its own packets (i.e., its local packet) (P_B) for each received packet (P_C) from its corresponding supplying I/O device 10c, ensuring an equal distribution of a local packet (P_B) and a received packet (P_C) on the transmission link 16b. Hence, for every received packet (P_C) that is forwarded by the I/O device 10b (also referred as a "forwarded packet"), the I/O device 10b is able to insert a local packet (P_B).

The I/O device 10a, however, cannot insert its corresponding local packet (P_A) for every received packet from its corresponding supplying I/O device 10b via the connected transmission link 16b, since an equal selection would result in the traffic to the bridge 12 on transmission link 16a having a distribution of 50% local packets (P_A) from the I/O device 10a, 25% packets (P_B) from device 10b, and 25% packets from device 10c. Hence, the I/O device 10 is configured for determining the source of each of the received packets on the corresponding connected transmission link 16b to determine the highest issue rate (ISR) for any one of the supplying I/O devices over a prescribed sampling interval. As illustrated in FIG. 1, the I/O device 10a is able to determine the issue rates of devices 10b and 10c such that, averaged over some sampling period, for every two received packets via transmission link 16$b$, one packet is from device 10$b$ and one packet is from device 10$c$ ($ISR_B=ISR_C=\frac{1}{2}$). Hence, the I/O device 10$a$ sets its insertion rate to equal the highest determined issue rate (INS_R=$ISR_C=\frac{1}{2}$), such that for every two packets received by the device 10$a$, the device 10$a$ is configured to insert a local packet (P_A), resulting in one local packet (P_A) for every two received packets from the corresponding connected supplying device 10$b$. Consequently, equal distribution of packets from the devices 10$a$, 10$b$, and 10$c$ can be provided on the transmission link 16$a$. The foregoing example assumes all links are fully utilized and that each device 10$a$, 10$b$, and 10$c$ is assigned an equal priority.

For another example, assume that the device 10$c$ was not utilizing the transmission link 16$c$ at 100% capacity; that is, it did not have a packet to send every time device 10$b$ freed a receive buffer. In that case, since device 10$b$ was draining its receive buffers faster than device 10$c$ was refilling them, device 10$b$'s receive buffers would eventually become empty. Once in that state, they would become nonempty each time a packet was received from device 10$c$, and then go empty again when that packet was transmitted, until the next packet was received. If device 10$b$ always had locally generated packets to send, then there would be periods when there were both packets to issue and forward, alternating with periods when there were only packets to issue. The issue path would always be granted when there was nothing to forward, allowing device 10$b$ to utilize the extra bandwidth which device 10$c$ did not use. If device 10$c$ was only issuing packets at 33% of the available (as limited by buffer releases from device 10$a$) bandwidth of link 16$b$, then device 10$c$ would have its packets forwarded at its rate of issue (33% of the bandwidth of link 16$b$) and device 10$b$ would have the rest (67%) of the bandwidth of link 16$b$). In other words, device 10$b$ would be allowed to insert 2 packets for every one of device 10$c$'s packets that it forwarded. Hence, the I/O device 10$a$ would detect, over a pattern of three received packets, that two received packets were from device 10$b$ ($ISR_B=\frac{2}{3}$), and that one received packet was from device 10$c$ ($ISR_C=\frac{1}{3}$), causing the device 10$a$ to set its insertion rate (INS_R) equal to the highest determined issue rate (INS_R=$ISR_B=\frac{2}{3}$), such that the device 10$a$ inserts two local packets (P_A) for every three forwarded packets (P_B or P_C). Consequently, the I/O device outputs onto transmission line 16$a$ repeating pattern of five packets, where two packets are local packets (2*P_A) and three packets are forwarded packets (e.g., 2*P_B and one P_C).

SUMMARY OF THE INVENTION

A problem is that the above-incorporated Patent Publication by Owen et al. assumes flow control is implemented for links consisting of a single virtual channel, illustrated in FIG. 1. However, an I/O device configured for establishing a high-speed communications link, for example according to Hyper-Transport™ protocol, needs to support multiple virtual channels. However, Owen et al. does not contemplate a system that may utilize multiple virtual channels, and in fact can lead to starvation, with some streams of packets never being sent in a system utilizing multiple virtual channels.

Hence, there is a need for an arrangement that enables a chain of I/O devices to allocate bandwidth fairly across devices and virtual channels. Fairness is a harder term to define in a multiple virtual channel system than it is in a single virtual channel system. In a single virtual channel system, there is a single bandwidth resource to be allocated, determined by the bandwidth of the link and the flow control credits issued by the receiver; the allocation is fair if all requesters receive an equal portion of the bandwidth, and bandwidth allocated to a device which that device does not consume is also equally allocated to the remaining devices. In a multiple virtual channel system, there are multiple bandwidth resources to be allocated. Each channel has a separate set of flow control credits, and then all channels share the bandwidth of the physical link. In the event that one requester's traffic is in one virtual channel and another requester's traffic is in a different virtual channel, and the receiver is only releasing buffers in one of the channels, it will not be possible to mix the traffic so that both requesters receive equivalent bandwidth on the link. A distributed arbitration system with multiple virtual channels is defined as fair if the following are true in a bandwidth-constrained system: (1) bandwidth is equally allocated among all request streams within a particular virtual channel; and (2) bandwidth is equally allocated among all requesting devices to the degree possible given the fact that flow control may throttle particular virtual channels. As always, if the system is not bandwidth-constrained, meaning the total bandwidth requested is less than the maximum bandwidth of the link, all devices should receive their requested bandwidth.

These and other needs are attained by the present invention, where buffer-level arbitration is used to allocate released buffers, based on received flow control credits, between local packets and received packets on respective virtual channels in accordance with a determined insertion rate relative to a second number of received packets to be forwarded. Virtual channel arbitration also is performed to identify, from among the multiple virtual channels, the packets that should be sent next along the local and forwarded paths. Device arbitration is then performed to identify, from the insertion and forwarding paths, the packets that should be output onto an output transmission link, based on the determined insertion rate. Performing the arbitration at each step in accordance with the insertion rate maximizes packet bandwidth fairness among the multiple devices supplying packets across multiple virtual channels.

One aspect of the present invention provides an Input/Output (I/O) device configured for receiving packets on an input transmission link and outputting packets to a receiver via an output transmission link. The I/O device includes measuring logic, first and second virtual channel arbiters, a buffer arbiter module and a device arbiter. The measuring logic is configured for identifying, from the received packets, at least one issue rate for at least one corresponding supplying device relative to an identified number of the received packets. The measuring logic is configured for calculating an insertion rate based on a highest value of the at least one issue rate, the insertion rate specifying a number of local packets that are to be transmitted onto the output transmission link relative to forwarding the identified number of received packets. The first virtual channel arbiter is configured for receiving a plurality of first buffer grant signals for respective available channels, and selecting from among the received packets a first packet based on the corresponding first buffer grant signal. The second virtual channel arbiter is configured for receiving a plurality of second buffer grant signals for the respective available channels, and selecting from among the local packets a second packet based on the corresponding second buffer grant signal. The buffer arbiter module is configured for selectively outputting the first buffer grant signals to the first virtual channel arbiter, and the second buffer grant signals to the second virtual channel arbiter, based on determined available buffer space in the receiver. The device arbiter is configured for selectively outputting, onto the output transmission link, one of the first or second packets according to the insertion rate.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

Figure 2:
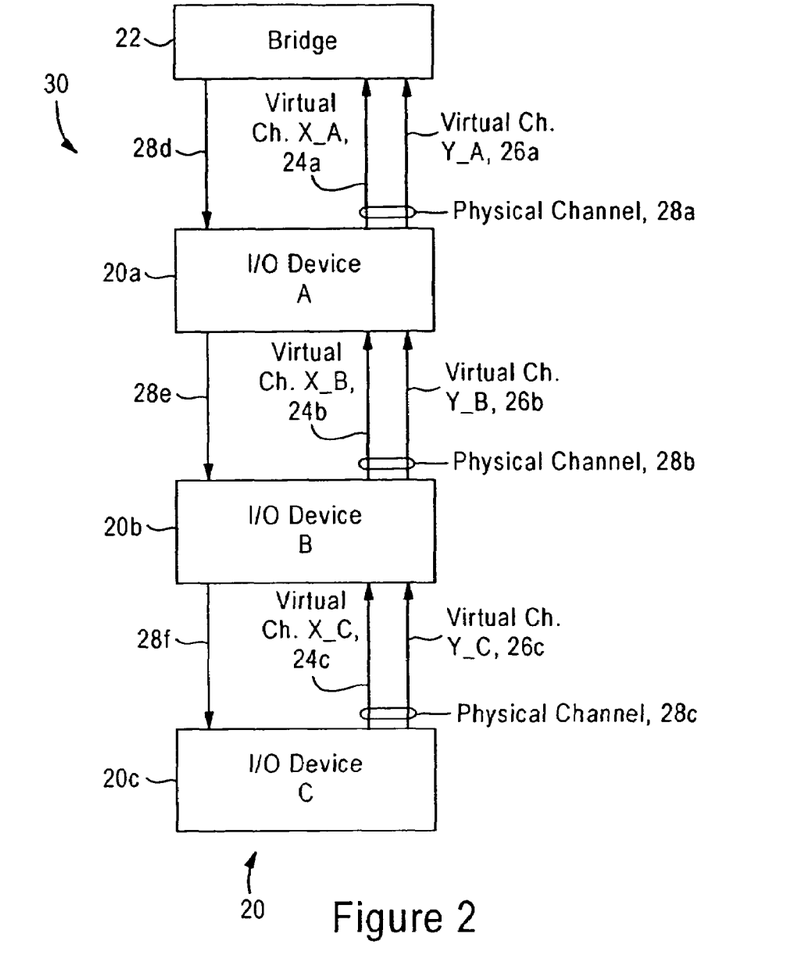
FIG. 2 is a diagram illustrating a chain of I/O devices configured for selecting packets for transmission among multiple virtual channels, according to an embodiment of the present invention.

FIG. 2 is a diagram illustrating multiple I/O devices 20 (e.g., 20a, 20b, and 20c) configured for supplying data packets to a bridge 22 via multiple virtual channels 24 ("X") and 26 ("Y") within physical links 28 (e.g., 28a, 28b, and 28c). The devices 20 may be implemented, for example, as HyperTransport™ compliant devices configured for transmitting and receiving packets on the physical links 28 in accordance with HyperTransport™ protocol. A description of the HyperTransport™ protocol can be found, for example, in the HyperTransport IO Link Specification, Rev. 2.0, including errata up to specification Rev. 1.05c. Although the devices 20 may be configured for processing additional virtual channels, this description assumes the additional virtual channels are idle for simplicity. This description also assumes that both virtual channels (X) 24 and (Y) 26 have data to transmit.

Figure 3:
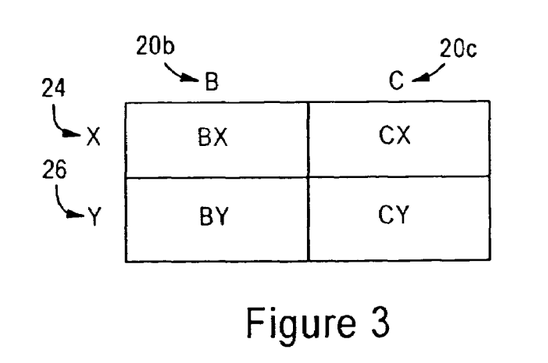
FIG. 3 is a diagram illustrating a selection matrix between local packets and received packets for multiple virtual channels.

FIG. 3 is a diagram illustrating a traffic decision matrix used by the I/O device 20b in determining what data packets to output onto the virtual channels 24b and 26b of the physical channel 28b. In particular, FIG. 3 illustrates that the I/O device "B" 20b receives data packets CX and CY from device C 20c on the respective virtual channels X_C 24c and Y_C 26c of physical channel 28c. The device B 20b also has local packets BX and BY destined for respective virtual channels X_B 24b and Y_B 26b of physical channel 28. Consequently, the device B 20b needs to operate as a 4:1 multiplexer that multiplexes four data sources BX, BY, CX, CY, namely two received virtual channels (X_C, Y_C) and two local virtual channels (X_B, Y_B), into a single physical channel 28b. It is also necessary to maintain certain ordering relationships between virtual channels within the same source. For instance, in HyperTransport™ protocol, it may be necessary for packets in the posted request channel not to pass packets in the nonposted request or response channels. Hence, the device B 20b needs to decide 3 levels of arbitration: (1a) the allocation of buffer credits in virtual channel X among packet sources BX and CX; (1b) the allocation of buffer credits in virtual channel Y among packet sources BY and CY; (2a) choosing the next insertion packet to be sent from sources BX and BY that have acquired buffers; (2b) choosing the next forwarding packet to be sent from sources CX and CY that have acquired buffers; and (3) choosing the next packet to be transmitted onto the physical channel 28b between the winner of the BX/BY and CX/CY arbitration.

In describing the operations of the device B 20b, it is assumed that the virtual channels X 24c and Y 26c from the device C 20c are operating at 100% capacity, and that device A 20a may be sending flow control credits to the device B 20b to control the output of data onto any one of the virtual channels X_B 24b or Y_B 26b. Also assume device A 20a is sending flow control messages to device B 20b indicating a release of internal X and Y buffers, permitting the device B 20b to alternate between sending a single packet for virtual channels X_B 24b and Y_B 26b.

As described previously, the above-incorporated Patent Publication by Owen et al. describes only the decision of either inserting a local packet or forwarding a received packet, without any consideration of multiple virtual channels X 24 or Y 26; hence, the fairness algorithm described by Owen et al. would cause a device B to choose only between the sources, namely device B 20b and device C 20c, without regard to virtual channel. However, the flow control initiated by device A 20a chooses between the virtual channels X and Y, without regard to device. Consequently, two independent decision-making schemes (B vs. C and X vs. Y) are required for the system 30 in FIG. 2. Moreover, when the two independent decision making schemes (B vs. C and X vs. Y) are combined, it can lead to starvation of traffic in some virtual channels from some sources, where no packets in that channel from that source are sent, even though packets may be available to send.

To further illustrate the problems associated with the two independent decision making schemes (B vs. C and X vs. Y), assume the I/O device 20b were to apply the prior art fairness algorithm by simply alternating between local packets (B) from device 20b and received packets (C) from device 20c; assume further that the factor limiting bandwidth on link 28a is the rate at which device 20a issues buffer release messages, such that device 20b is always waiting to receive a buffer release, immediately sends a packet in response to that buffer release, and then must wait for the next one; assume further that the device A 20a were to alternate flow control messages in order to alternately request a packet between virtual lane X_B 24b and virtual lane Y_B 26b.

Consider in this example the first packet sent by the I/O device B 20b: if device B 20b was sending packet "BX", it would next forward a packet received from device C 20c; however, device A 20a has just released a buffer from the virtual lane X_B 24b (X_B), so the device A 20a will next release a buffer from the virtual lane Y_B 26b. Consequently, the second device B 20b would send a "CY" packet in accordance with its internal device selection and the external virtual lane arbitration by the device A 20a using flow control.

Now consider the third packet sent by the I/O device B 20b: device 20b had just forwarded the second packet "CY" for device C 20c, hence the third packet will be a local packet from device B 20b; however, device A 20a has just released a buffer from the virtual lane Y_B 26b (CY), so the device A 20a will next release a buffer from the virtual lane X_B 24b. Consequently, the second device B 20b would send a "BX"

packet in accordance with its internal device selection and the external virtual lane arbitration by the device A 20a using flow control.

As apparent from the foregoing, the decision process is repeated, resulting in the alternate transmission of only packets BX and CY, such that packets BY and CX are never sent. This problem becomes even more complex as additional virtual channels are added.

The above-described example has additional problems in that the two objectives of obtaining fairness in packet bandwidth for a device that independently selects between local and forwarded packets, and providing fair distribution of data packets across multiple virtual lanes based on external controls (e.g., flow control), are in conflict with each other. For example, if device B 20b only wanted to send unlimited BX packets (and had no BY packets) and device C 20c only wanted to send unlimited CY packets (and had no CX) packets, then in this case the device B 20b would only have two sources of data (BX and CY) in FIG. 3. However, if device A 20a only wants packets for virtual channel X_B 24b and implements flow control accordingly, then the device B 20b would send only packets BX for virtual channel 24b because it is prevented from sending any packets (e.g., CY) for virtual channel Y_B 26b.

Hence, there is a need to enable each device to perform a selection for outputting a data packet onto the corresponding physical channel based on a concurrent evaluation between the available virtual channels and the traffic load between the devices on the respective virtual channels.

According to the disclosed embodiment, each receiving device (e.g., device 20b) is configured for applying a dual-arbitration methodology for selecting an output packet, assuming that the receiving device has sufficient bandwidth to service each of the available virtual channels. For example, the device 20b is configured not only to calculate an insertion rate as described above in the Patent Publication by Owen et al and applying it to the selection of packets to insert vs forward, but also is configured to apply the same insertion rate to the allocation of buffers in each virtual channel to insertion and forwarding traffic.

In particular, the device 20b is configured to calculate an insertion rate (INS_R) based on the received traffic to be forwarded. As buffer releases are received from device 20a in each virtual channel, they are allocated among local packets and received packets awaiting transmission on link 28b. If only a single buffer is available and there are both local and received packets awaiting transmission, the buffer is granted to a local packet vs. a received packet based on INS_R. A second level of arbitration chooses the next packet to be inserted from among the various virtual channels containing local packets that have buffers allocated to them, and the next packet to be forwarded from among the various virtual channels containing received packets that have buffers allocated to them. A third level of arbitration chooses between the two results of the second level of arbitration to determine the packet that should next be output on the physical link 28b. If there are both insertion and forwarding packets to be sent, the insertion packet is chosen over the forwarding packet at the rate given by INS_R.

Figure 4:
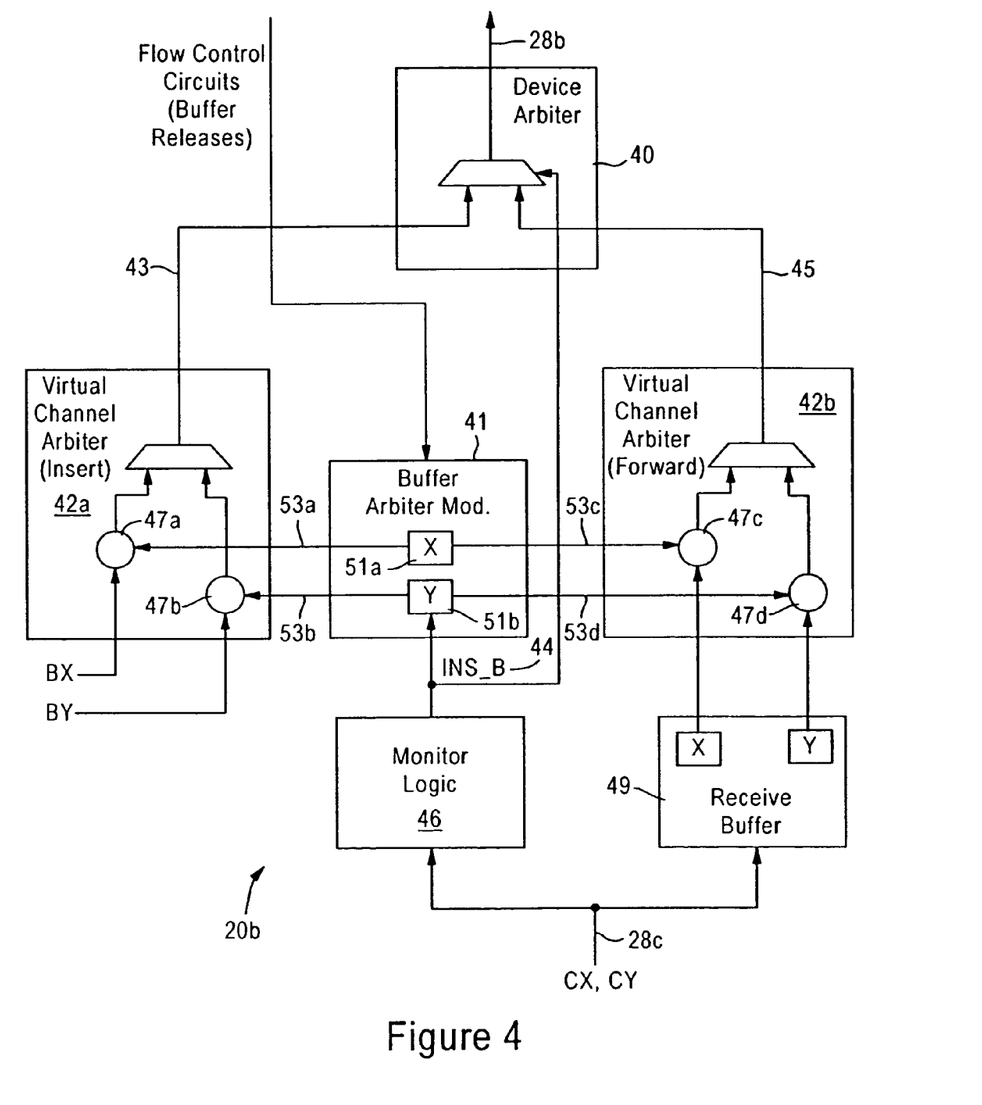
FIG. 4 is a diagram illustrating one of the I/O devices of FIG. 2, according to an embodiment of the present invention.

FIG. 4 is a diagram illustrating in further detail the multi-level arbitration performed by each I/O device, for example device 20b. Each I/O device 20 (e.g. device 20b) includes Flow Control Counters and Buffer Arbiter 41, configured to track the number of buffers available at the receiver (e.g., device 20a) at the far end of the link based on received flow control credits (i.e., buffer release messages). Each I/O device 20 also includes a virtual channel arbiter 42a that includes gates 47a and 47b, and a virtual channel arbiter 42b that includes gates 47c and 47d. Each I/O device also includes receive buffers 49 for storing the received packets CX and CY via physical link 28c, a device arbiter 40, and monitor logic 46, also referred to as measuring logic.

The Flow Control Counters and Buffer Arbiter 41, also referred to herein as a buffer arbiter module, is configured to selectively grant available space in the receive buffers of the next upstream device (in this example, device 20a) to packets arbitrating at the two virtual channel arbiters 42a and 42b. In particular, the buffer arbiter module 41 includes a flow control credit counter 51a, 51b for each virtual channel X, Y. Each counter 51a, 51b is incremented in response to a buffer release for the corresponding virtual channel, and decremented in response to a buffer being granted to a packet on the corresponding virtual channel by a buffer grant signal 53a, 53b, 53c, or 53d. If counter 51a has a flow control credit value of 0, no buffers can be granted to packets in the X virtual channel (BX or CX). If counter 51a has a flow control credit value of greater than 1, buffers can be granted to packets in the X virtual channel in both virtual channel arbiters (BX and CX), if both such packets are present, hence the buffer arbiter module 41 outputs buffer grant signals 53a and 53c.

If counter 51a has a flow control credit value that is equal to 1, and packets of both types (BX and CX) are present, the buffer arbiter module 41 chooses which virtual channel arbiter 42a or 42b to grant the buffer to according to the calculated insertion rate, INS_B 44, and asserts the corresponding selected buffer grant signal (either 53a or 53c). If counter 51a has a flow control credit value that is equal to 1 but only one packet is present (e.g., only 1 BX but no CX), there is no arbitration to perform, and the single packet is granted the buffer based on asserting the corresponding buffer grant signal (either 53a or 53c). Buffer arbitration for the virtual channel Y is performed in a similar manner, based on the has a flow control credit value of counter 51b and granting buffers to packets BY and CY by the buffer arbiter module 41.

The virtual channel arbiters 42a and 42b are configured for selecting the next virtual channel to issue a packet in the respective insertion and forwarding paths 43 and 45, based on the associated buffer grant signals 53a and 53b for arbiter 42a and buffer grant signals 53c and 53d for arbiter 42b. A packet may be selected only if it has been granted a corresponding buffer by the corresponding buffer grant signal from the buffer arbiter module 41. The device arbiter 40 is configured for arbitrating between the insertion path 43 and the forwarding path 45 for the next packet to be transmitted on the physical link 28b.

Each device 20 also includes measuring logic 46 configured for metering the traffic for the input transmission link 28c. In particular, the measuring logic 46 is configured for calculating, for each supplying device 20 (e.g., 20c) having supplied data to the receiving device 20b via the corresponding connected input transmission link 28c, the corresponding issue rate (e.g., $ISR_C$ for device 20c) 48 among the virtual channels 24c and 26c transmitted by the transmission link 28c. The measuring logic 46 is configured for calculating for the device 20b the insertion rate (INS_B) 44 based on selecting the highest issue rate calculated for the devices 20 supplying data via the transmission link. The insertion rate (INS_B) is used by each of the buffer arbiter 41 and device arbiter 40 to ensure the fairest possible allocation of buffer resources and physical link data bandwidth, given the limitations imposed by the mixes of traffic and buffer releases among the various virtual channels.

Additional details describing outputting the selected packets by the device arbiter 40 according to the insertion rate INS_B 44 is described in the above-incorporated Patent Publication by Owen et al.

Figure 5:
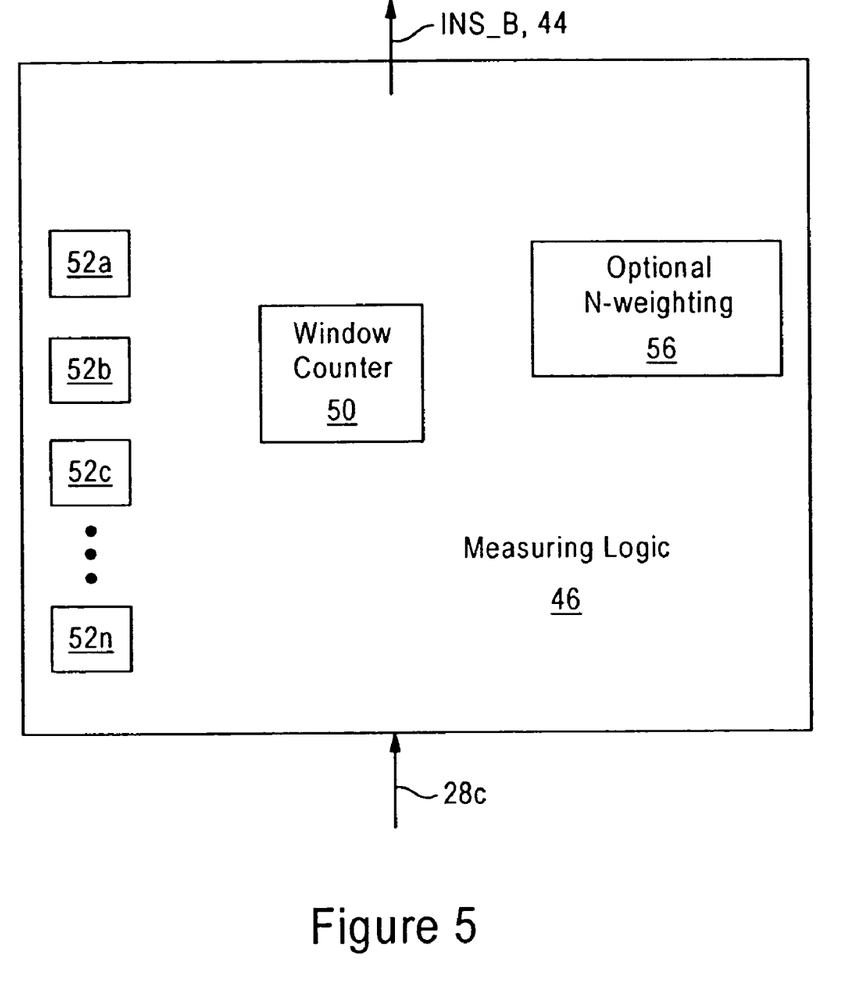
FIG. 5 is a diagram illustrating the measuring logic of FIG. 4, according to an embodiment of the present invention.

FIG. 5 is a diagram illustrating the measuring logic 46. The measuring logic 46 includes a window counter 50, a plurality of device counters 52a, 52b, 52c, ... to 52n which correspond to each potential I/O device that may be "downstream" (i.e., arranged to supply packets to the current device via the corresponding input transmission link). For example, in an embodiment in which thirty-one unit IDs are available for assignment to the I/O devices in any single daisy chain in the I/O subsystem, each I/O device implements thirty-one counters 52. Each of the counters 52 counts the number of packets received from the corresponding I/O device. The window counter 50 is configured for counting the total number of packets received from all of the devices via the input transmission link.

The device counters 52a, 52b, etc. and window counter 50 are incremented for each received packet until one of the device counters reaches a predetermined threshold. The device corresponding to that device counter is the highest insertion rate (ISR) device, and its insertion rate is given by threshold/window, where window is the value in the window register at that time. This becomes the calculated insertion rate (INS_R) for the I/O device 20. As the threshold value is fixed for a particular implementation, it is only necessary to latch the window value at the time that the threshold is reached. The measuring logic 46 also includes an N-weighting module 56 configured for selectively applying a weighting factor (N) to the insertion rate calculation. INS_R is then threshold*N inserted packets for every window packets forwarded. After the window value is latched, all counters are cleared, and the calculation of an insertion rate over a new window performed. Hence, the insertion rate is achieved based on choosing packets from the arbiter in the appropriate ratios.

According to the disclosed embodiment, arbitration among virtual channels in accordance with a device-based insertion rate prevents starvation of packets within one or more virtual channels from one or more sources in a transmission link having multiple virtual channels. In addition, the disclosed arrangement enables multiple shares of bandwidth to be allocated in a single device.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. An Input/Output (I/O) device configured for receiving packets on an input transmission link and outputting packets to a receiver via an output transmission link, the I/O device comprising:

measuring logic configured for identifying, from the received packets, at least one issue rate for at least one corresponding supplying device relative to an identified number of the received packets, the measuring logic configured for calculating an insertion rate based on a highest value of the at least one issue rate, the insertion rate specifying a number of local packets that are to be transmitted onto the output transmission link relative to forwarding the identified number of received packets;

a first virtual channel arbiter configured for receiving a plurality of first buffer grant signals for respective available virtual channels, the first virtual channel arbiter configured for selecting from among the received packets a first packet based on the corresponding first buffer grant signal;

a second virtual channel arbiter configured for receiving a plurality of second buffer grant signals for the respective available virtual channels, the second virtual channel arbiter configured for selecting from among the local packets a second packet based on the corresponding second buffer grant signal;

a buffer arbiter module configured for applying the insertion rate to each of the virtual channels based on selectively outputting the first buffer grant signals to the first virtual channel arbiter, and the second buffer grant signals to the second virtual channel arbiter, based on determined available buffer space for each of the virtual channels in the receiver; and a device arbiter configured for selectively outputting, onto the output transmission link, one of the first or second packets according to the insertion rate.

2. The device of claim 1, wherein the buffer arbiter module includes flow control credit counters configured for determining the available buffer space in the receiver based on counting received flow control credits for the respective virtual channels, each flow control credit counter decremented in response to a corresponding output of a packet belonging to the corresponding virtual channel.

3. The device of claim 2, wherein the buffer arbiter module is configured for selectively outputting one of the first and second buffer grant signals, for a corresponding one of the virtual channels, according to the insertion rate based on the corresponding flow control counter having a single flow control credit for the corresponding one virtual channel and based on a determined availability of one of the local packets and a one of the received packets for the virtual channel to a value of the first counter upon the one device counter reaching the prescribed threshold.

4. The device of claim 1, wherein the measuring logic includes:

a first counter configured for counting the identified number the received packets relative to a counting window;

a plurality of device counters, each device counter configured for counting the packets having been transmitted from the corresponding supply device, the counted packets corresponding to the issue rate for the corresponding supply device relative to the counting window; and wherein the insertion rate is determined based on one of the device counters reaching a prescribed threshold, normalized relative to a value of the first counter upon the one device counter reaching the prescribed threshold.

5. The device of claim 1, wherein the applying the insertion rate to each of the virtual channels prevents starvation within the virtual channels.

6. A method in an Input/Output (I/O) device configured for receiving packets on an input transmission link and outputting packets to a receiver via an output transmission link, the method comprising:

identifying, from received packets having been received by the device, at least one issue rate for at least one corresponding supplying device relative to an identified number of the received packets, the identifying including calculating an insertion rate based on a highest value of the at least one issue rate, the insertion rate specifying a number of local packets that are to be transmitted onto the output transmission link relative to forwarding the identified number of received packets;

selecting, by a first virtual channel arbiter within the device configured for receiving a plurality of first buffer grant signals for respective available virtual channels, from among the received packets a first packet based on the corresponding first buffer grant signal;

selecting, by a second virtual channel arbiter within the device configured for receiving a plurality of second buffer grant signals for the respective available virtual channels, from among the local packets a second packet based on the corresponding second buffer grant signal;

applying the insertion rate to each of the virtual channels based on selectively outputting the first buffer grant signals to the first virtual channel arbiter, and the second buffer grant signals to the second virtual channel arbiter, by a buffer arbiter module based on determined available buffer space for each of the virtual channels in the receiver; and selectively outputting, onto the output transmission link, one of the first or second packets according to the insertion rate.

7. The method of claim 6, further comprising determining the available buffer space in the receiver based on counting received flow control credits for the respective virtual channels by flow control credit counters, each flow control credit counter decremented in response to a corresponding output of a packet belonging to the corresponding virtual channel.

8. The method of claim 7, wherein the selectively outputting of the first and second buffer grant signals includes selectively outputting one of the first and second buffer grant signals, for a corresponding one of the virtual channels, according to the insertion rate based on the corresponding flow control counter having a single flow control credit for the corresponding one virtual channel and based on a determined availability of one of the local packets and a one of the received packets for the virtual channel.

9. The method of claim 6, wherein the identifying is performed by measuring logic that includes:

a first counter configured for counting the identified number the received packets relative to a counting window;

a plurality of device counters, each device counter configured for counting the packets having been transmitted from the corresponding supply device, the counted packets corresponding to the issue rate for the corresponding supply device relative to the counting window; and wherein the insertion rate is determined based on one of the device counters reaching a prescribed threshold, normalized relative to a value of the first counter upon the one device counter reaching the prescribed threshold.

10. The method of claim 6, wherein the applying the insertion rate to each of the virtual channels prevents starvation within the virtual channels.

* * * * *